Aug. 25, 1964 J. KOCHIS 3,145,498
LINE TWISTING AND UNTWISTING ATTACHMENT
Filed Dec. 21, 1962

John Kochis
INVENTOR.

BY *Clarence A. O'Brien
and Harvey B. Jacobson*
Attorneys

United States Patent Office 3,145,498
Patented Aug. 25, 1964

3,145,498
LINE TWISTING AND UNTWISTING ATTACHMENT
John Kochis, 18310 Allen Road, Melvindale, Mich.
Filed Dec. 21, 1962, Ser. No. 246,601
3 Claims. (Cl. 43—43.13)

The present invention pertains to a comparatively simple mechanical device which can be readily attached to the trailing end of a fishing line and which when properly adjusted and trolled at a predetermined speed through a body of water will function to untwist a twisted line.

As will be hereinafter evident the invention functions in conjunction with a spinning reel, level-winding or trolling reels, with or without a rod. It comprises a bladed rotor, more particularly, a hub-like body having diametrically opposite sides provided with cooperating vanes or blades which make it possible to rotate or spin the body either clockwise or counterclockwise. The vanes or blades are so constructed and mounted that they may be interchanged and employed to cause rotation of said body to the left or right as desired. It follows that the invention is simple in construction, is easy to handle and use and of a size, relatively speaking, that it takes up but little room in the angler's often-crowded tackle box.

The invention is such in construction that it works satisfactorily just under the water surface, does not get fouled up in underwater seaweeds and will not hug the bottom or bed of the water being fished. Repeated usage of the device has proved that it will untwist the line and tends to restore the same to its original condition.

Briefly the invention is characterized by a pair of duplicate planar blades or vanes. The inner lengthwise marginal edges of these vanes or blades are separably and adjustably mounted on diametrically opposite surfaces or sides of an intervening body. The body provides a satisfactory mounting and is in effect a hub which joins the blades or vanes together in relatively angled relationship.

More explicitly, the device comprises a substantially rectangular block-like body having X-shaped kerfs in diametrically opposite sides, said kerfs serving to permit the coacting blades or vanes to be so positioned in relation to each other and the body to enable the device to spin or turn clockwise or counterclockwise whichever is necessary in untwisting and restoring the twisted line.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3:
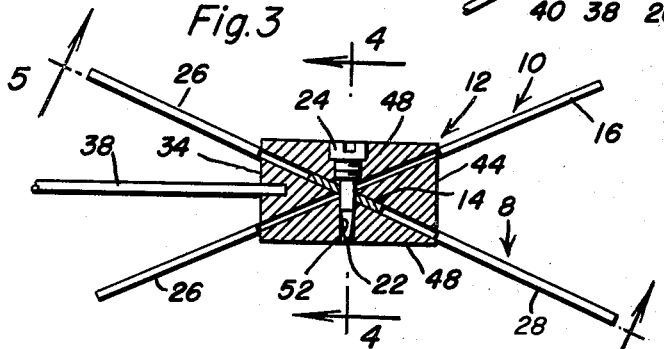
FIGURE 3 is an enlarged view with parts in section and elevation which is taken approximately on the plane of the line 3—3 of FIG. 1.
Figure 4:
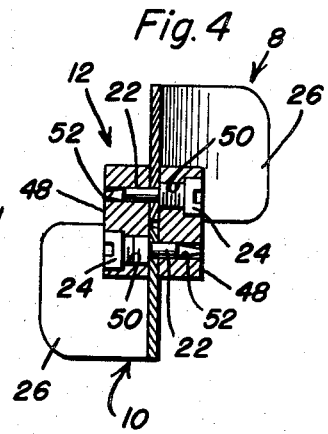
FIGURE 4 is a cross section through the center of the device taken on the plane of the section line 4—4 of FIG. 3.
Figure 5:
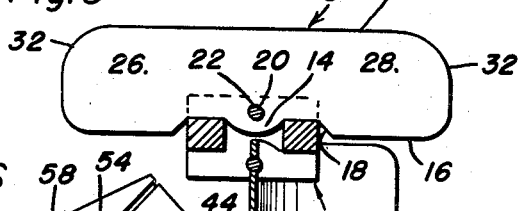
FIGURE 5 is a sectional view on the plane of the section line 5—5 of FIG. 3 and which shows the manner in which the median portions of the vanes or blades are pinned to the mounting block.

With reference to the drawing, a fishing line twist treating member is shown including two substantially duplicate flat-faced or planar elongated vanes or blades one of which is denoted by the numeral 8, the companion blade at 10, said blades being joined together and consequently mounted on an intervening assembling and connecting body or hub 12. With reference to FIG. 5 it will be seen that each blade is of elongated form and of a length appreciably greater than the length of the block or body 12. The median portion 14 of the inner lengthwise edge 16 of each blade is provided with a clearance and seating notch 18, the portion 14 of the notch proving an attaching and retaining lug or ear which has a central hole 20 therein to accommodate the pointed non-threaded pin portion 22 (FIGS. 3 and 4) of the associated mounting and clamping bolt or equivalent fastener 24. The projecting leading end portion of each blade is denoted at 26 and the projecting rearward or trailing half-portion is designated at 28. The outer lengthwise edge is also generally straight as denoted at 30. The corners of the respective transverse end portions are suitably rounded as at 32.

Figure 1:
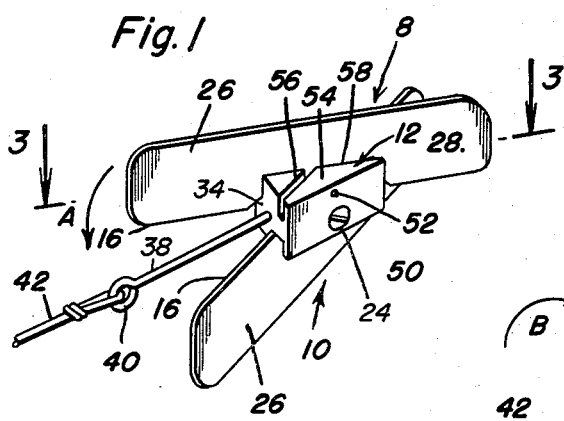
FIGURE 1 is a view in perspective of a spinner-type line-attachment for twisting and untwisting a fishing line.
Figure 2:
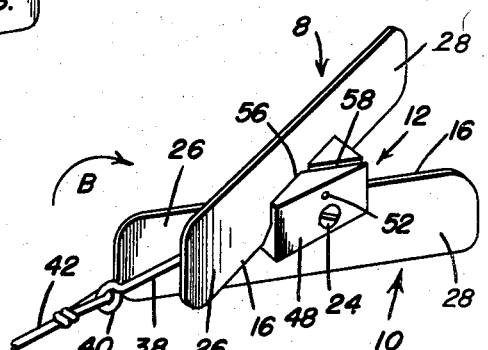
FIGURE 2 is also a view in perspective showing the varied or adjusted angular relationship of the vanes.
Figure 6:
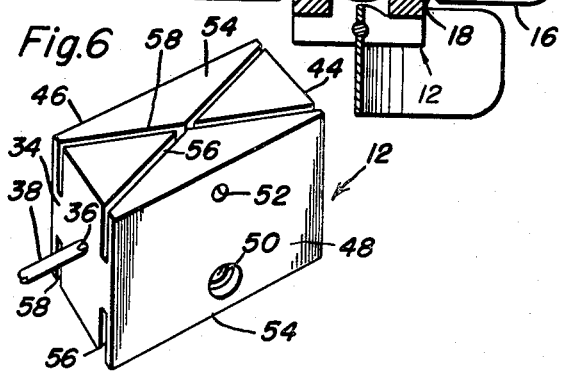
FIGURE 6 is an enlarged perspective view of the block-like body with the vanes removed therefrom.

The assembling and mounting block or body is preferably constructed of aluminum and is approximately oblong in shape and embodies a leading end 34 to which the rearward end 36 of a pin or shank 38 is axially connected. The forward or leading end of this shank or pin is provided with a line attaching eye 40 to which an end portion 42 of the fishline is separably connected. The trailing end or surface of the block is denoted at 44. The diametrically opposite side surfaces 46 and 48 are the same in construction and each surface has a screw-threaded hole 50 therein to accommodate the headed threaded end portion of the fastener 24 in a manner shown in FIG. 4. There is also a nonthreaded bore or passage 52 of appropriate cross-section to accommodate the nonthreaded shank portion 22 of the fastener. The remaining and consequently diametrically opposite surfaces 54 are the same in construction and each surface has X-shaped grooves or kerfs formed therein. One kerf is designated in FIG. 6 by the numeral 56 and the other one by the numeral 58. These kerfs intersect at their respective median portions and the ends open through the respective ends 34 and 44 of the body or block. The median lug-equipped portions 14 of the blades are fitted selectively into whichever kerf or groove is desired and the blade is then bolted or fastened in place as shown in FIG. 4. The two blades are also so mounted that their intermediate portions cross each other and their end portions 26 and 28 project forwardly and rearwardly beyond the forward and rearward end surfaces 34 and 44 of the block or body. When the blades 8 and 10 are in the slots 58 as shown, for example, in FIG. 1 the blades then coact with the body to cause the device to twirl or rotate in a counterclockwise direction as indicated by the arrow A in FIG. 1. By detaching and adjusting the blades or vanes so that they are reversed and are then positioned in the respective slots 56 on the opposite sides 54 the then achieved angling of the vanes is such that the device is caused to rotate or turn clockwise as denoted by the arrow B in FIG. 2.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A device of the class described comprising a substantially rectangular body having diametrically opposite sides each provided with X-shaped slots defining selectively usable kerfs, and reversible interchangeable elongated blades constituting vanes, said blades having inner lengthwise edge portions keyed in selected kerfs, fastening means carried by said body and connected with coacting median portions of said blades for retaining the blades in place, line-attaching means joined to and adapted to be rotated by said blade-equipped body, said means being secured to an axial portion of the forward end of said body, and a fishing line having an end thereof attached to said means.

2. The structure defined in claim 1 and wherein said line-attaching means comprises a shank having a rearward end fixed to the forward end of said body, said shank provided at a forward end thereof with a line-attaching eye to which the aforementioned fishing line is connected whereby the bladed body functions to rotate the shank and eye and consequently the fishing line in a manner to untwist the line.

3. A twist removing line restoring device comprising: a flat-faced body having a forward end, a rigid shank axial with and having a rearward end rigidly joined to said forward end, said shank extending forwardly from said forward end and having line-attaching means at its leading end, a line connected at one end to said line-attaching means, said body having top and bottom surfaces, each surface being provided with X-shaped blade-receiving and positioning slots, said slots opening at their ends through the forward and rearward ends of said body, a pair of planar vanes, said vanes being duplicates of each other, interchangeable, of a width greater than the lengthwise and crosswise section of said body, and also of a length significantly greater than the length of the body, whereby forward and rearward end portions project beyond the forward and rearward ends of said body, and fastening means mounted accessibly on available surfaces of said body, said fastening means being connected to associated portions of the respective vanes and serving to positively secure said vanes in their functioning positions in their respectively cooperating slots.

References Cited in the file of this patent

UNITED STATES PATENTS

| 1,920,935 | Khoenle | Aug. 1, 1933 |
| 2,003,245 | Carey | May 28, 1935 |
| 2,003,550 | Muller | June 4, 1935 |
| 2,836,002 | Miller | May 27, 1958 |
| 2,967,372 | Pass et al. | Jan. 10, 1961 |

FOREIGN PATENTS

| 3,007 | Great Britain | 1889 |